JAMES E. EMERSON.
Improvement in Saws.
No. 113,992.
Patented April 25, 1871.
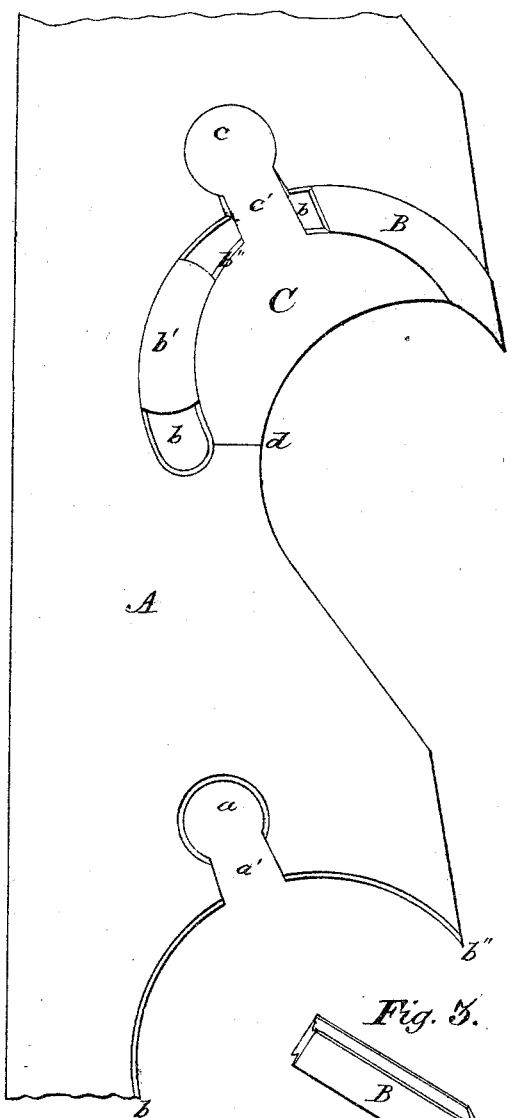
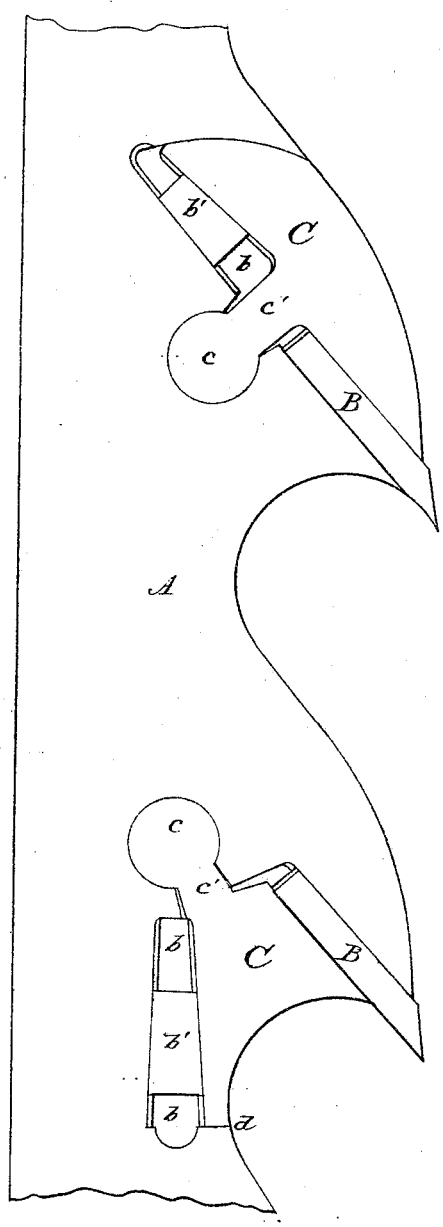
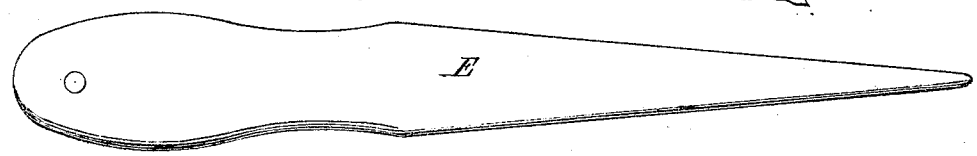
Witnesses:
Charles Chim
Chas. E. Wilson
Inventor:
James E. Emerson
By N. Cranford
atty.

UNITED STATES PATENT OFFICE.

JAMES E. EMERSON, OF TRENTON, NEW JERSEY.

IMPROVEMENT IN SAWS.

Specification forming part of Letters Patent No. 113,992, dated April 25, 1871.

I, JAMES E. EMERSON, of Trenton, in the county of Mercer, in the State of New Jersey, have invented certain Improvements in Saws for Sawing Wood, of which the following is a specification:

The object of the invention is to make saws having insertible or removable teeth in such manner as that the teeth can be inserted in or removed from the saw-plate with less loss of time, and be securely held in position or easily relieved from one position and adjusted to another; and it consists in the construction of the devices and their relation to the saw-plate and teeth that produce the desired effect.

In the drawing, Figure 1 represents a section of a saw having curved insertible teeth and the devices which hold the teeth in position. Fig. 2 is a section of a saw having straight teeth that are insertible and the devices that hold the teeth in place, at the lower end of the figure, and at the upper end is a modification of the same invention, showing the holding device as applied to the back or outside of the tooth. Fig. 3 is a view of a straight insertable tooth, in perspective; and Fig. 4 is a side view of the instrument by which the teeth are clamped in place or relieved from the clamp in order to be adjusted or taken from the saw-plate.

A is the plate of any saw, whether circular or reciprocating, and having insertible or removable teeth. B represents the insertible teeth, which may be curved or straight, as desired, and having V-shaped or half-round grooves, as fancy may dictate, to fit upon and against the angular or round projecting rib $b''$ on the saw-plate at the back of the tooth; or the ridge on the back side of the clamp can be of the same form as that on the saw-plate, and be held against any tendency to lateral movement, as seen in Fig. 3.

C is a pivoted clamp or tooth-holder, constructed to conform in shape to the throat side of the insertible teeth, whether straight or curved, and having a V-shaped or half-round rib on its inner edge to fit into the groove in the throat side of the tooth, and has the neck $c'$ and an enlarged circular pivotal part, $c$, which is inserted into the circular opening $a$ in the saw-plate and neck $c'$ in the space $a'$, as seen in the lower end of Fig. 1. The circular opening $a$ in plate A is enlarged on the two sides by countersinking, as seen in Fig. 1. The clamp C, with its neck $c'$ and pivot or round part $c$, is punched out of plate A before the plate is tempered or ground, and so as to form the space or slot $b$ between the clamp-piece C and saw-plate A to have a tapered form, whether the space or opening be circular or straight. Each side of the opening $b$ has raised V-shaped or half-round ridges, as seen in Figs. 1 and 2, and so that a wedge or key, $b'$, having V-shaped or half-round grooves in its edges, will slide between plate A and clamp-piece C, and be guided and held by such grooves and ridges in its forward and backward movement. The clamp-piece C, being punched out of the plate A by a nicely-adjusted punch and die, and the opening in the plate enlarged to form the space or opening $b$, and the edges of the clamp piece and plate dressed to have the ridge $b''$, and the opening $a$ countersunk on each side of the plate, is then put back by inserting the part $c$ in opening $a$ and neck $c'$ into space $a'$, which is enlarged on its sides, as seen in Figs. 1 and 2, to admit of the oscillation of the clamp-piece C, when the pivot-piece $c$ is slightly riveted down on each side to set the metal into the countersinks in the two sides of the plate, but not so much as to prevent the clamp C from turning in the opening $a$ by its pivot $c$, so as to be made to bear against the throat side of tooth B and recede from bearing against or clamping the tooth against the saw-plate whenever it is necessary to relieve it, whether for removing or adjusting the tooth.

$b'$ is a wedge of the shape to fit in the slot or opening $b$, and has a V-shaped groove in its edges, and so as to be reciprocated in the slot or opening $b$, and be held from danger of lateral displacement by the grooves in its edges, which embrace the ridges, whether angular or round, on the saw-plate A and clamp-piece C.

The teeth B are thicker on their forward edges than the saw-plate, as is common in most insertible teeth, and so that no set in the points of the teeth is necesssary, as they are kept to their width by swaging and then dressing them to the proper width on the cut by the common dressing-gage for that purpose.

E is a tapering handle-lever for forcing the wedge $b'$ forward or backward, in order to clamp the tooth in the plate or to relieve the tooth from the clamp.

In cutting the clamp-piece C from the saw-plate A, the forward end is so cut from the plate that when the tooth B is in place and clamped it will abut against the edge of the saw-plate, as seen in Figs. 1 and 2 at $d$, which abutment is preferably made to have the common rib and groove, so as to prevent any lateral movement of the abutting parts upon each other.

When the clamp-piece C is inserted in the plate A and the pivotal piece $c$ headed or riveted into the slight countersinks on each side of the plate A, the wedge $b'$ inserted in the slot or opening $b$ in its widest part, the saw is then ready for grinding, tempering, and finishing; and after being finished, and while the clamp and wedge are in such position, the tooth B is inserted into its proper place and position, when the point of hand-lever E is inserted in the opening $b$ at the larger end of wedge $b'$, when the wedge is forced toward the shank or neck $c'$ by being forced to the right or left, the saw-plate forming the fulcrum to the lever to force the wedge forward, and causing the clamp to be oscillated toward and bear firmly against the throat side of tooth B and the back side of tooth B against the saw-plate A, thus securely clamping and holding the tooth firmly in place.

When it is necessary to relieve the tooth from the saw the lever-wrench E will be placed upon the narrow end of wedge $b'$, and, by the same process as described, the wedge will be forced back, when the clamp C, by a gentle rap on its forward end at $d$ with a hammer or lever-wrench, will be forced away from and the tooth B can be removed or adjusted as to its projection.

In Fig. 2, at its upper end, is shown a modification in the construction of the clamping device, where the clamp C is placed upon the outer and back side of the tooth B, the only difference in the two methods being in the location of the devices that form the clamp by which the tooth is held in its position.

This construction of means by which the removable and adjustable teeth in saws are firmly held in place is simple, easily constructed, and durable, is not liable to get out of order, and costs but a trifle, while in the construction of the teeth there is a great saving over the usual form of insertible teeth.

What I claim as my invention is—

1. The clamp or holder C, having neck $c'$ and pivot-piece $c$, in the manner and for the purpose described.

2. The clamp or holder C, as above claimed, and wedge $b'$, in combination with tooth B, when the tooth, clamp, and wedge are constructed and arranged to clamp and hold the said tooth B in contact with the saw-plate A', in the manner described.

JAMES E. EMERSON.

Witnesses:
 EDM. F. BROWN,
 CHARLES CHINN.